(12) United States Patent
Kainu et al.

(10) Patent No.: US 9,389,001 B2
(45) Date of Patent: Jul. 12, 2016

(54) BOILER, AND A SILENCER FOR A FLUE GAS DUCT IN A BOILER

(75) Inventors: Vesa Kainu, Kangasala (FI); Juha Ojanpera, Lapua (FI)

(73) Assignee: VALMET TECHNOLOGIES OY, Espoo (FI)

( * ) Notice: Subject to any disclaimer, the term of this patent is extended or adjusted under 35 U.S.C. 154(b) by 260 days.

(21) Appl. No.: 14/122,518

(22) PCT Filed: May 24, 2012

(86) PCT No.: PCT/FI2012/050502
§ 371 (c)(1),
(2), (4) Date: Dec. 3, 2013

(87) PCT Pub. No.: WO2012/160261
PCT Pub. Date: Nov. 29, 2012

(65) Prior Publication Data
US 2014/0076247 A1    Mar. 20, 2014

(30) Foreign Application Priority Data

May 26, 2011 (FI) .................................... 20115524
May 26, 2011 (FI) .................................... 20115525

(51) Int. Cl.
*F01N 1/02* (2006.01)
*F24H 9/00* (2006.01)
(Continued)

(52) U.S. Cl.
CPC ............ *F24H 9/0005* (2013.01); *F22B 37/06* (2013.01); *F23L 15/04* (2013.01); *F23M 20/005* (2015.01); *F23J 2900/13003* (2013.01)

(58) Field of Classification Search
CPC .................... F23J 2900/13003; F23M 20/005; F01N 1/02; F01N 1/24
USPC ............................................. 122/135.1, 208
See application file for complete search history.

(56) References Cited

U.S. PATENT DOCUMENTS 3,263,654 A * 8/1966 Cohan ................... F22B 37/202
122/4 R
4,226,279 A * 10/1980 Eisinger ................ F22B 37/102
122/4 R
(Continued)

FOREIGN PATENT DOCUMENTS

DE    23 37 517 A1    2/1975
DE    36 04 695 A1    8/1987
(Continued)

OTHER PUBLICATIONS

Oct. 8, 2014 Search Report issued in European Patent Application No. 12790375.5.
(Continued)

*Primary Examiner* — Gregory A Wilson
(74) *Attorney, Agent, or Firm* — Oliff PLC

(57) ABSTRACT

A boiler includes a flue gas duct and heat exchanger pipes in the flue gas duct. The boiler includes a planar silencer plate, which silencer plate includes sound absorbing material, and said first silencer plate being placed downstream of one of said heat exchanger pipes in the flow direction of flue gases in said flue gas duct. Furthermore, a silencer for a flue gas duct with a rectangular cross-section in a boiler, the silencer including at least a first and a second planar silencer plate substantially parallel to the flow direction of flue gases, the silencer plates including sound absorbing material. The first silencer plate is placed at an angle to the second silencer plate, wherein the width of the resonating area of the flue gas duct becomes narrower in two directions transverse to the flow direction of the flue gases.

20 Claims, 10 Drawing Sheets

(51) Int. Cl.
*F23L 15/04* (2006.01)
*F22B 37/06* (2006.01)
*F23M 20/00* (2014.01)

(56) References Cited

U.S. PATENT DOCUMENTS

| | | | | |
|---|---|---|---|---|
| 5,058,664 | A * | 10/1991 | Gentry | F28F 9/0132 165/134.1 |
| 5,318,109 | A * | 6/1994 | Yamada | F22B 37/40 122/4 R |
| 7,878,298 | B2 * | 2/2011 | Winter | F01N 1/082 181/227 |
| 8,097,072 | B1 * | 1/2012 | Taylor | F01N 1/02 422/186.04 |
| 9,121,610 | B2 * | 9/2015 | Lam | F23R 3/002 |
| 2013/0042600 | A1 * | 2/2013 | Gerlach | F01N 5/02 60/322 |
| 2015/0283897 | A1 * | 10/2015 | Schiebeck | F01N 1/02 181/264 |

FOREIGN PATENT DOCUMENTS

| | | |
|---|---|---|
| DE | 93 16 608.7 U1 | 2/1995 |
| EP | 0 105 990 A1 | 4/1984 |
| JP | H08-121706 A | 5/1996 |
| JP | A 9-203502 | 8/1997 |
| JP | A 10-115402 | 5/1998 |
| JP | A 2001-108227 | 4/2001 |

OTHER PUBLICATIONS

Translation of Mar. 5, 2012 Search Report issued in Finnish Patent Application No. 20115524.
Translation of Mar. 5, 2012 Search Report issued in Finnish Patent Application No. 20115525.
Sep. 20, 2012 Search Report issued in International Patent Application No. PCT/FI2012/050502.
May 21, 2015 Office Action issued in Finnish Patent Application No. 20115525.

* cited by examiner

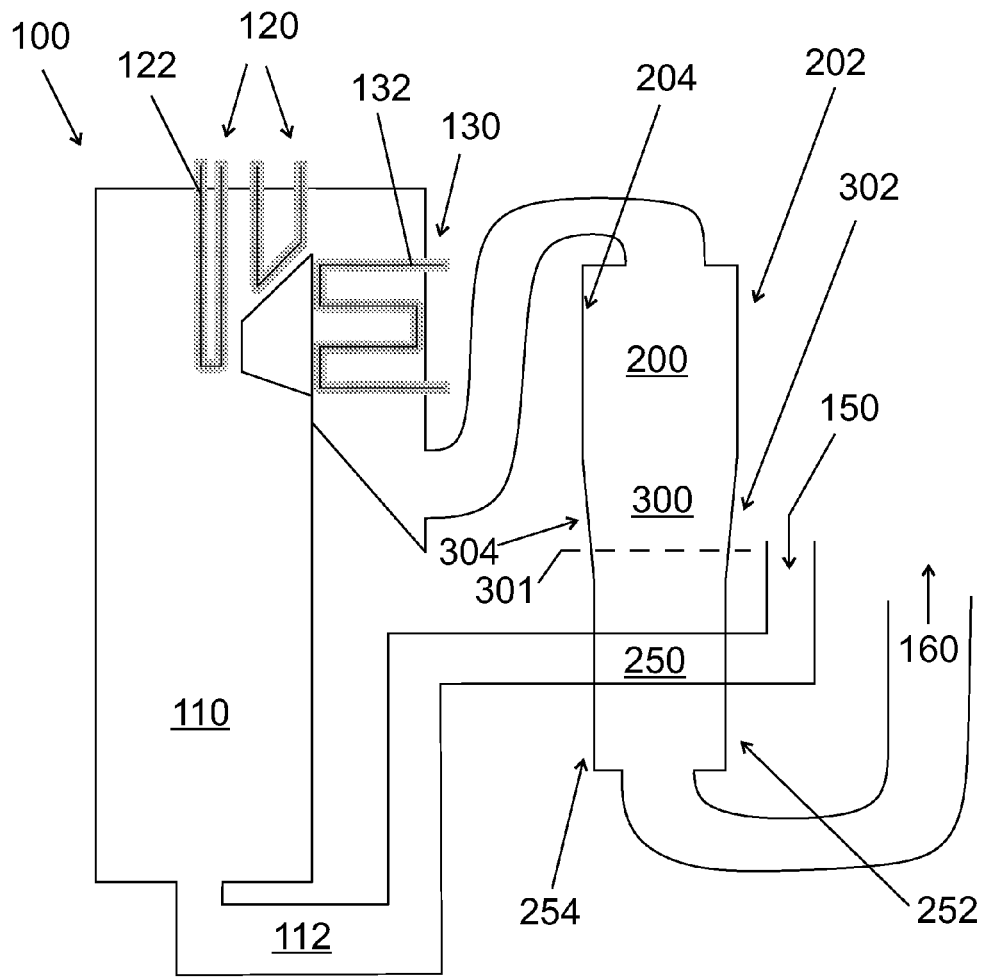
PRIOR ART
Fig. 1a
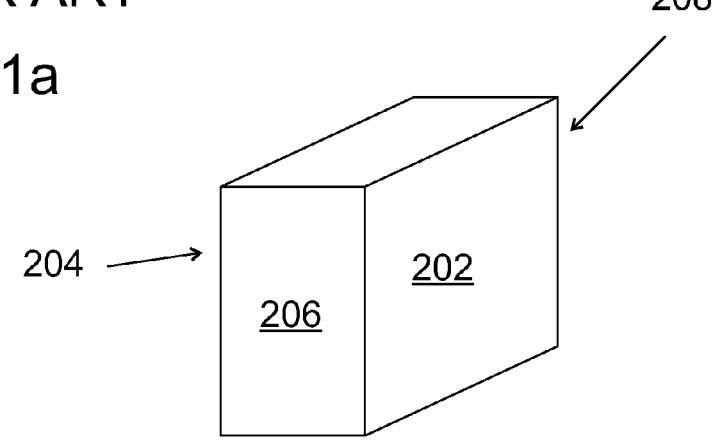
PRIOR ART   Fig. 1b

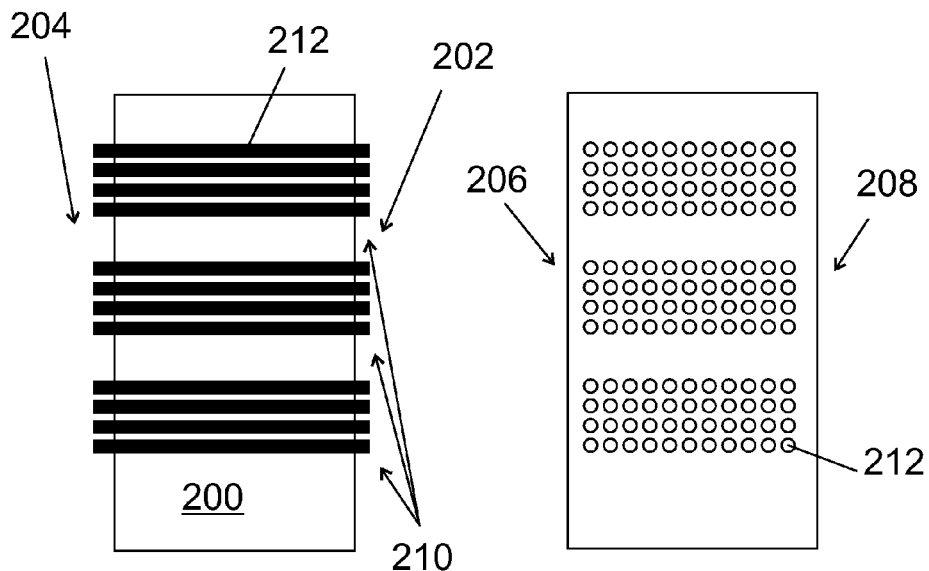
PRIOR ART
Fig. 2a
PRIOR ART
Fig. 2b
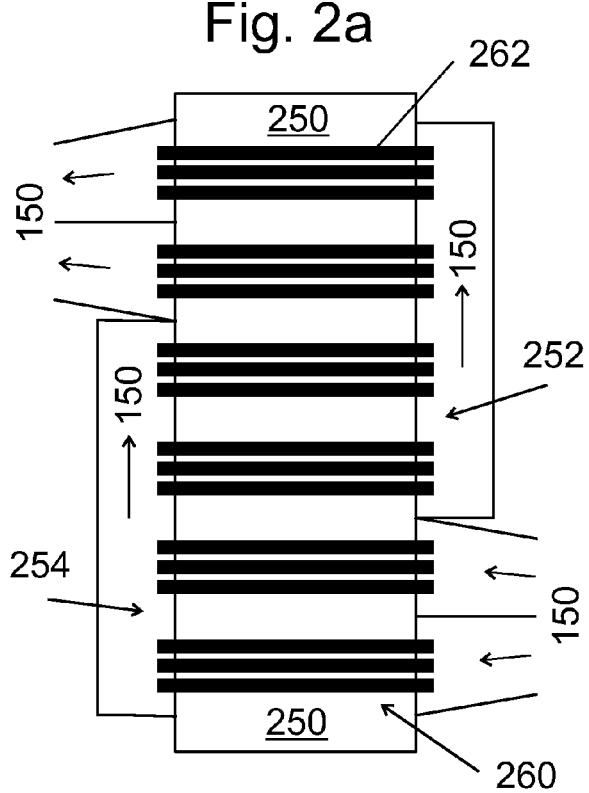
PRIOR ART
Fig. 2c
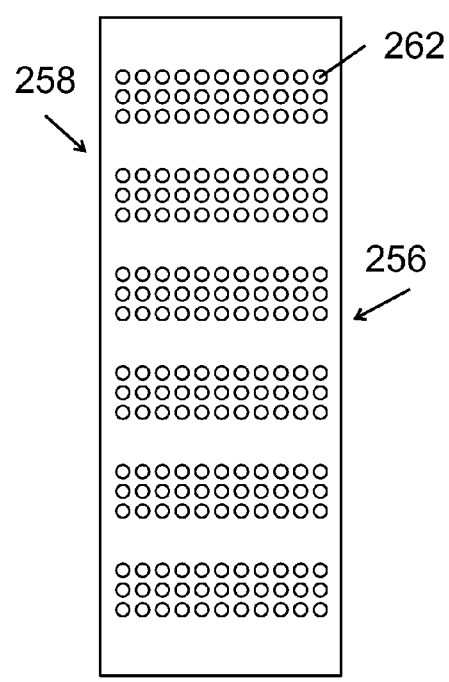
PRIOR ART
Fig. 2d

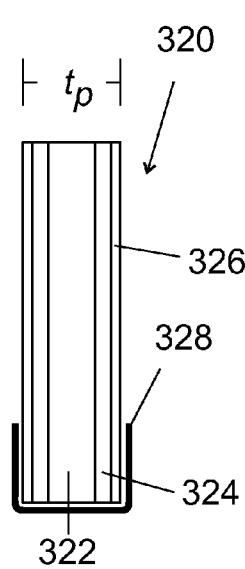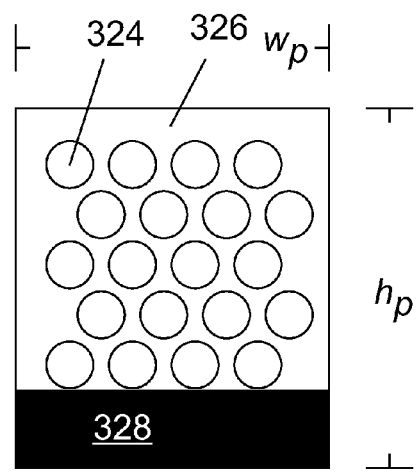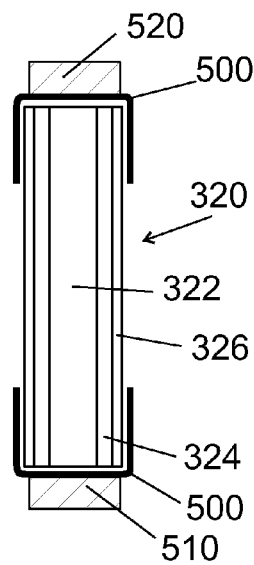
Fig. 4a      Fig. 4b      Fig. 5b
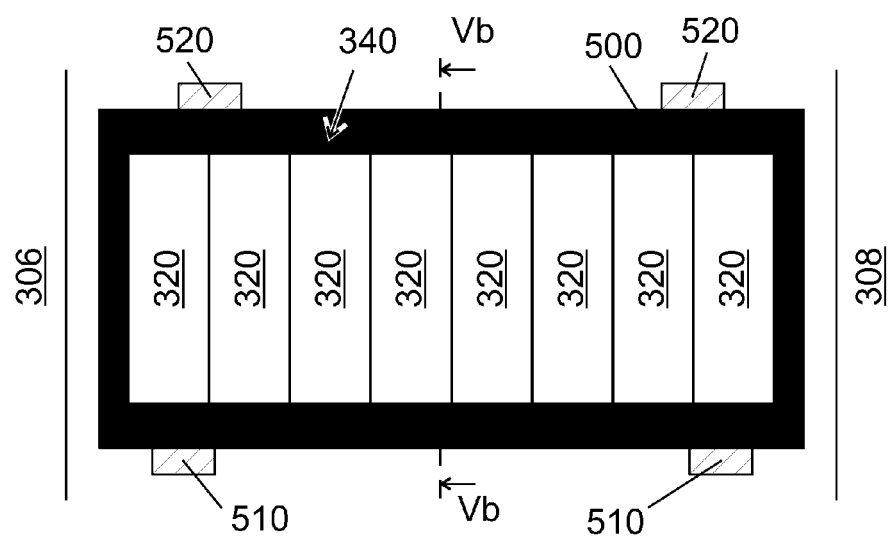
Fig. 5a

BOILER, AND A SILENCER FOR A FLUE GAS DUCT IN A BOILER

FIELD OF THE INVENTION

The invention relates to a boiler whose flue gas duct is provided with a silencer.

BACKGROUND OF THE INVENTION

Boilers are used for burning burnable material for producing energy. An example of a boiler 100 of prior art is shown in a side view in FIG. 1a. The boiler comprises a furnace 110, in which the burnable material is burnt, as well as a duct 112 for supplying combustion air 150. Heat is produced in a combustion process in the furnace, which heat is recovered from flue gases and radiation. Heat can be recovered, for example, by superheaters 120 at the top of the furnace. From the furnace, the flue gases are led into a flue gas duct. From the flue gas duct, heat can be recovered by evaporators 130. The superheaters 120 and the evaporators 130 typically comprise heat exchanger pipes 122 and 132, respectively, for recovering heat. Heat can be recovered in, for example, water or steam. Furthermore, water can be preheated in a water preheating area 200. Moreover, heat can be recovered in combustion air 150 in an air preheating area 250. Cooled flue gases 160 can be removed from the process. For example, supporting structures for water and air preheaters can be provided in a smoke passage 300 between the water preheating area 200 and the air preheating area 250. The figure also shows the front wall 302 and the rear wall 304 of the flue gas duct. The flue gas duct may have a substantially rectangular shape in the cross-sectional plane 301 transverse to the flow direction of the flue gases, wherein it may comprise side walls which are substantially transverse to the front wall 302 and parallel to the direction of the flow of the flue gas. In a way corresponding to the smoke passage, the water preheating area 200 may also comprise a front wall 202 and a rear wall 204. In a corresponding way, the air preheating area 250 may comprise a front wall 252 and a rear wall 254. FIG. 1b illustrates the mutual location of the front wall 202, the rear wall 202, the first side wall 206, and the second side wall 208.

A problem in boilers of prior art is the noise produced in them. The noise produced typically has a frequency between about 40 Hz and about 100 Hz. The noise is typically tonal; that is, the noise is loudest close to a given frequency or close to some given frequencies. This given frequency may be influenced by, for example, the dimensions of the boiler or the flue gas duct. The tonal noise differs from, for example, noise in which the vibration takes place at substantially the same volume in a wide frequency band.

FIG. 2a shows a more detailed side view of the water preheating area 200. One possible source of the noise is turbulence of the flue gas flow. Turbulence is caused by, for example, the water preheaters 210 in the water preheating area 200. The preheaters 210 may be, for example, pipe bundles. FIG. 2b illustrates the pipe bundles in more detail in another side view, substantially transverse to FIG. 2a. The pipe bundles comprise heat exchanger pipes 212. According to FIGS. 2a and 2b, the pipes 212 can extend from the front wall 202 to the rear wall 204. The turbulence can also be influenced by the air preheaters 260 in the air preheating area 250.

FIGS. 2c and 2d illustrate the air preheaters 260 which can also be pipe bundles and comprise pipes 262. The flow of combustion air 150 in the air preheater is shown with arrows in FIG. 2c. Also, the air preheating pipes 262 can extend from the front wall 252 to the rear wall 254 of the air preheating area 250. The air preheating pipes 262 are located between the side walls 256 and 258 of the air preheating area 250.

According to prior art, noise can be prevented in boilers by plates provided in the flue gas duct. The plates can be, for example, metal plates intended for affecting the formation of a standing sound wave and its wavelength. However, sufficient noise suppression has not been achieved in the prior art. In some solutions, the placement of the plates in the flue gas duct makes it more difficult to remove dust from the flue gas duct.

BRIEF SUMMARY OF THE INVENTION

It has been found that noise produced in boilers can be suppressed by providing a noise absorbing silencer plate as a silencer substantially in the flow direction of the flue gas downstream of the heat exchanger pipes in the direction of the flue gases in the flue gas duct. Several plates can be provided. The noise absorbing plates suppress noise efficiently. By placing the plates just downstream of the heat exchanger pipes, noise can be efficiently suppressed, because the noise may be produced by turbulence of the flue gas flow caused just by the heat exchanger pipes. Furthermore, the temperature of the flue gases is lower downstream than upstream of the heat exchanger pipes, so that such a silencer is not exposed to as hot conditions as upstream of the heat exchanger pipes.

It has been found that noise produced in boilers can be suppressed by providing noise absorbing silencer plates as a silencer substantially in the is flow direction of the flue gas in the flue gas duct in such a way that at least two silencer plates are placed at an angle to each other. The noise absorbing plates suppress noise efficiently. The placement of the plates at an angle to each other reduces the width of the resonating area. The placement of the plates substantially in the flow direction of the flue gases makes the removal of dust easier.

In an embodiment, the silencer comprises a service aisle, along which it is possible to maintain, for example to clean the flue gas duct, the silencer plates or the silencer.

In an embodiment, the boiler comprises a subfloor space, through which it is possible to maintain, for example to clean the flue gas duct, the silencer plates or the silencer.

In an embodiment, the silencer plates truncate the resonating area of the flue gas duct, wherein the resonance length corresponding to a low frequency is eliminated.

DESCRIPTION OF THE DRAWINGS

In the following, the invention will be described in more detail with reference to the appended drawings, in which:

FIG. 1a shows a boiler of prior art in a side view,

FIG. 1b shows the front, rear and side walls of a water preheating area,

FIGS. 2a to 2d show the water preheating area in a side view and an end view as well as the air preheating area in corresponding side and end views;

FIGS. 4a and 4b show a silencer plate in two side views,

FIGS. 5a and 5b show a wall of a silencer,

In FIGS. 1 to 8, corresponding numerals or symbols refer to corresponding elements.

DETAILED DESCRIPTION OF THE INVENTION

Figure 3A:
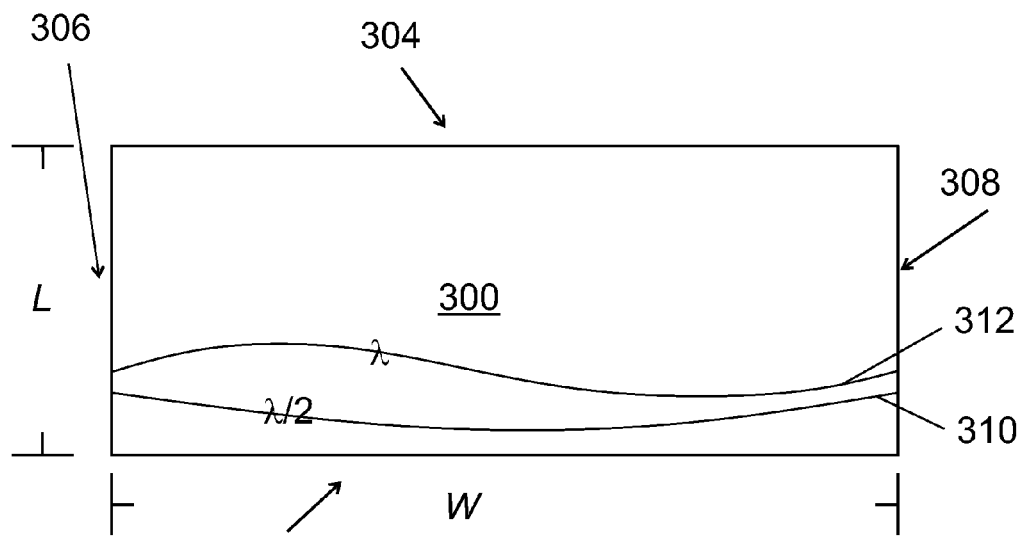
FIG. 3a shows a resonating area of a flue gas duct in an elevation.

FIG. 3a shows a cross-sectional view of a flue gas duct in a cross-sectional plane substantially transverse to the flow direction of the flue gases. The flue gas duct has a width W and a depth L. The width W can be several meters, between 4 and 12 m, and for example about 8 m. The depth L can be several meters, between 2 and 5 m, and for example about 3.5 m. Tonal noise common in boilers can be produced by resonance formed between substantially parallel walls of the flue gas duct. Thus, the distance between the parallel surfaces can be a multiple of half the wavelength. For example, in FIG. 3a, the longest resonating wave 310 has a length twice the width W of the flue gas duct, wherein the width W corresponds to half the wavelength ($\lambda/2$). The next resonance frequency may occur when the wavelength $\lambda$ corresponds to the width W of the flue gas duct. The resonance frequencies are significantly influenced by the surface of the flue gas duct which may affect the reflection of the wave. If the boundary condition caused by the surface is not taken into account, the following relation can be determined between the wavelength $\lambda$ in resonance and the width W of the flue gas duct: $W=n\lambda/2$, where n is an integer (1, 2, 3, . . . ). In a known way, the frequency of sound is dependent on the speed and the wavelength of the sound: $f=v/\lambda$. From these starting points, the following relation can be derived for the frequency of the sound in resonance and the dimension of the flue gas duct:

$$f = \frac{nv}{2W}.$$

From the equation, it is possible to calculate several resonance frequencies corresponding to different values n. In a corresponding manner, in the depth direction of the flue gas duct, it is possible to determine possible resonance frequencies $f=nv/2L$. The speed of sound is dependent on the density and pressure of gas. As the density increases, for example when the temperature falls, the speed of sound decreases. Consequently, the speed of sound may be higher in a hot flue gas duct than at room temperature. The speed of sound affects the resonance frequency in the above described way. Typically, downstream of the water preheater in the smoke passage, the temperature of the flue gas is about 250° C. According to an approximation, the speed of sound in hot air is 343 m/s+0.6 m/s° C.×(T−20° C.), where T is the temperature in degrees Celsius. According to this approximation, the speed of sound in, for example, air at 250° C. would be about 480 m/s. When the speed of sound decreases, the resonance frequency decreases as well, because the resonance frequency is directly proportional to the speed of sound in the above described way. At said speed of sound 480 m/s, a duct with a width of 8 m can resonate at a frequency of e.g. 30 Hz, as well as its multiples. In a corresponding manner, a duct with a depth of 3.5 m can resonate at a frequency of e.g. 69 Hz and its multiples. The frequency of the noise detected is typically between 40 and 100 Hz, which may correspond to resonance in the width direction at some resonance frequencies (n=2 or 3) or resonance in the depth direction at some other resonance frequencies (n=1).

It is possible that no resonance occurs in the length direction of the flue gas duct (from above downwards in FIGS. 2a to 2d), because in this direction the flue gas duct may also comprise other than parallel reflective structures. With reference to FIGS. 1 and 2, for example the heat exchanger pipes 212 and 262 may prevent the formation of resonance in the longitudinal direction of the flue gas duct.

The noise can be suppressed with a silencer. The silencer can comprise a silencer plate or several silencer plates. In addition, noise can be suppressed by vibration preventing plates. Noise at a given frequency can be reduced, for example, by suppressing the noise by silencer plates and/or by changing the lengths of the structure so that the resonance frequency is changed. Silencer plates can be used, for example, to make the width of the resonating area narrower. The silencer plates can also be used to truncate the resonating area, that is, to reduce the resonating length. Thus, there is no transverse visual connection between two parallel walls of the flue gas duct. The silencer plates can be used to make the area narrower in said width direction or in said depth direction or both of these directions. In a corresponding manner, the silencer plates can be used to truncate the resonating length in said width direction or said depth direction or both of these directions.

Figure 3B:
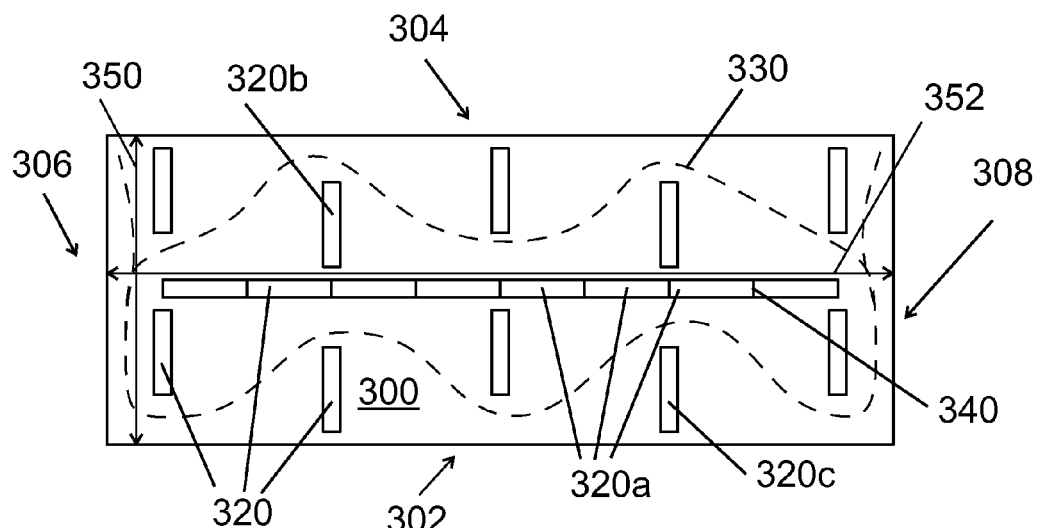
FIG. 3b shows an embodiment of a silencer in an elevation.

FIG. 3b shows an embodiment of a silencer for a flue gas duct of a boiler. In the figure, the silencer is shown in an elevation and is placed in the smoke passage 300 of the flue gas duct (FIG. 1a). Although the silencer is placed in the smoke passage 300 in the figure, it is obvious that a silencer according to the invention can also be placed elsewhere in the flue gas duct. In particular, the silencer according to the invention can also be placed elsewhere than in the presumed location of origin of the noise. The noise can be produced, for example, by turbulence caused by heat exchanger pipes, but there are no heat exchanger pipes in the smoke passage. The silencer can be placed exactly in the smoke passage 300 downstream of the water preheating area 200. The silencer can be placed downstream of the heat exchanger pipes 132 of the evaporator in the flow direction of the flue gases. Alternatively or in addition, the silencer can also be placed after the heat exchange pipes 212 of the water preheater. Moreover, the flue gas duct may be provided with heat exchanger pipes 262 of the preheater for combustion air, wherein the silencer can be placed upstream of said heat exchanger pipes 262. Consequently, the silencer can be placed between some heat exchanger pipes (132, 212) and some other heat exchanger pipes (212, 262) in the flow direction of the flue gases. Also, several silencers can be placed in the flue gas duct. Moreover, the silencer according to the invention can be placed even upstream of the heat exchanger pipes in the flow direction of the flue gases in the flue gas duct, or in a flue gas duct without heat exchanger pipes.

The smoke passage is limited by a front wall 302, a rear wall 304, a first side wall 306, and a second side wall 308. The first side wall 306 can form, for example with the first side wall 206 of the water preheating area, a part of the first side wall of the flue gas duct (cf. FIGS. 1a and 1b). In a corresponding manner, the second side wall 308 can form, for example with the second side wall 208 of the water preheating area, a part of the second side wall of the flue gas duct.

In the embodiment of FIG. 3b, the silencer comprises silencer plates 320. The silencer plates 320 are substantially planar and parallel to the flow direction of the flue gases. In the smoke passage 300 of the boiler shown in FIG. 1a, the flow direction of the flue gases is substantially from above downwards. In such an orientation of plates, it becomes easier to remove dust from the flue gas duct and the silencer plates. The silencer plates 320 comprise noise absorbing material.

The aim of the silencer plates 320 is to reduce noise of particularly low frequencies. Therefore, the silencer plates 320 can be placed in such a way that the width of the resonance area is limited in the direction transverse to the greatest resonating length of the flue gas duct and transverse to the flow direction of the flue gases. The width can be limited, for example, by placing silencer plates at an angle to each other, for example by placing two plates at an angle to each other. In the flue gas duct of FIG. 3a, the greatest resonating length is the width W of the flue gas duct. The direction transverse to this and transverse to the flow direction of the flue gases is the depth of the flue gas duct in the figure.

In the silencer assembly of FIG. 3b, the silencer plates 320 are placed in such a way that the width of the resonance area is significantly limited in the direction transverse to the greatest resonating length of the flue gas duct and transverse to the flow direction of the flue gases. The limited resonance area is illustrated with the reference numeral 352, at which point the flue gas duct can resonate by a dimension W corresponding to its width direction, wherein the resonance frequency can be low. In the silencer according to FIG. 3b, the silencer plates 320 are placed at an angle to each other; in particular, the plates 320b and 320c are placed at an angle to the plates 320a. When silencer plates 320 are placed at an angle to each other, the width of the resonance area is also limited in the direction transverse to the smallest resonating length and transverse to the flow direction of the flue gases. This limited resonance area is illustrated by the reference numeral 350, at which point the flue gas duct can also resonate by the dimension L corresponding to its depth direction.

By the placement of the silencer plates, it is possible to influence the extent of limiting the width of the resonance area. The width of the resonance area can be limited, for example, by at least 50%, at least 66% or at least 75%, in both directions transverse to the flow direction of the flue gases.

In FIG. 3b, the width of the resonance area transverse to the greatest resonating length of the flue gas duct and transverse to the flow direction of the flue gases has been limited by about 85%; in other words, the width of the resonating area is about 15% of the depth L of the flue gas duct. A part of said resonance area is illustrated with the reference numeral 352. In FIG. 3b, there are two other corresponding parts above the wall 340 and two underneath the wall 340.

In FIG. 3b, the width of the resonance area transverse to the smallest resonating length of the flue gas duct and transverse to the flow direction of the flue gases has also been limited by about 85%; in other words, the width of the resonating area is about 15% of the width W of the flue gas duct. A part of said resonance area is illustrated with the reference numeral 350. A corresponding other part is found on the right hand side of the wall 340 in FIG. 3b.

The silencer shown in FIG. 3b comprises a wall 340 that comprises silencer plates 320a and is placed in the direction of the side wall of the flue gas duct (from the front wall 302 to the rear wall 304) substantially in the centre of the flue gas duct. The wall 340 is substantially transverse to said direction of the side wall. In FIG. 3a, some plates forming the wall are indicated with the reference numeral 320a. Furthermore, the silencer may comprise silencer plates 320 which are substantially transverse to said wall. One such plate is denoted with the reference numeral 320b and another one with the reference numeral 320c. Such a plate 320b can be closer to the wall 340 than to the wall of the flue gas duct, or such a plate 320c can be closer to the wall of the flue gas duct than to the wall 340. Thus, the distance between the silencer plate 320c and the wall 340 can be greater than the distance between the silencer plate 320b and the wall 340.

Figure 3C:
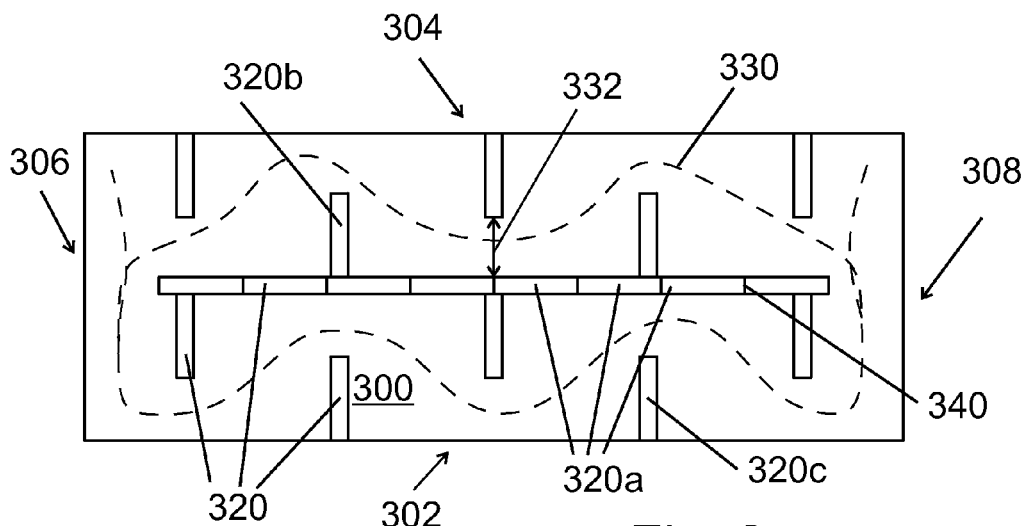
FIG. 3c shows another embodiment of a silencer in an elevation.

FIG. 3c shows another embodiment of the silencer. In the silencer according to FIG. 3c, the resonating area has been truncated in the width direction of the flue gas duct, wherein the silencer plates have been used to truncate the resonating length. Particularly in FIG. 3c, the longest resonating length has been truncated, which would correspond to the width W without the silencer in the flue gas duct. The silencer plates 320 are arranged in such a way that there is no transverse visual connection between the parallel walls 306 and 308 of the flue gas duct. Such a solution is achieved, for example, by connecting part of the silencer plates that are substantially transverse to the wall 340, to the wall 340. Such plates are denoted with the reference numeral 320b. In a corresponding manner, part of the silencer plates that are substantially transverse to the wall 340 can be connected to the wall of the flue gas duct. Such plates are denoted with the reference numeral 320c.

Figure 3D:
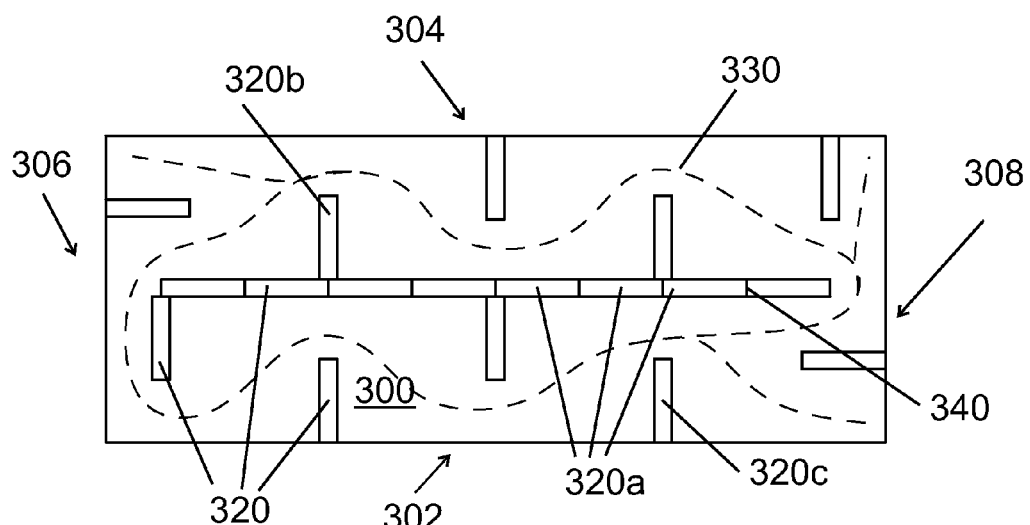
FIG. 3d shows a third embodiment of a silencer in an elevation.

FIG. 3d shows a third embodiment of the silencer. In the silencer according to FIG. 3d, the resonating area has been truncated in the width direction of the flue gas duct, wherein the silencer plates have been used to truncate the longest resonating length corresponding to the width. The silencer plates are thus arranged in such a way that there is no transverse visual connection between the substantially parallel walls 306 and 308 of the flue gas duct. Furthermore, the resonating area has been truncated in the depth direction of the duct, wherein the silencer plates have been used for truncating the shortest resonating length corresponding to the depth. The silencer plates are thus arranged in such a way that there is no transverse visual connection between the substantially parallel walls, the front wall 302 and the rear wall 304, of the flue gas duct.

Figure 3E:
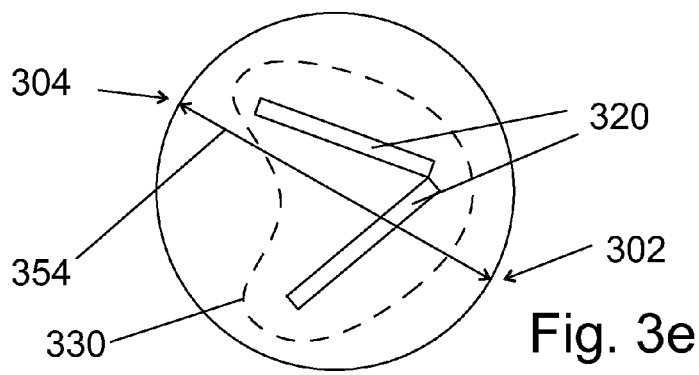
FIG. 3e shows a fourth embodiment of a silencer in an elevation.

FIG. 3e shows an embodiment of the silencer in a flue gas duct which is substantially circular in the cross-sectional plate transverse to the flow direction of the flue gases. In such a flue gas duct, one part of the wall can be defined as the front wall 302, and a substantially parallel other part of the wall as the rear wall 304. The resonating area 354 would be formed between these substantially parallel parts. In FIG. 3e, the silencer comprises two silencer plates 320 arranged in an angle to each other. Said angle is not necessarily straight.

The silencers shown in FIGS. 3b to 3e comprise silencer plates 320 aligned substantially in the flow direction of the flue gases. It is possible that the flow direction of the flue gases is substantially horizontal, substantially vertical, or another direction. Furthermore, in a substantially vertical flue gas duct, the flow direction may be upwards or downwards.

The silencers shown in FIGS. 3b to 3e also comprise a service aisle 330. The service aisle 330 is in the plane substantially transverse to the flow direction of the flue gases. The silencer comprises two silencer plates aligned in the flow direction of the flue gases and placed at an angle to each other, wherein said plane is substantially transverse to the silencer plates. The service aisle 330 is limited by the silencer plates 320 of the silencer. Part of the service aisle can be left between the silencer plates 320, and part of the service aisle can be left between the silencer plate 320 and the wall of the flue gas duct. Via the service aisle, it is possible to maintain at least one of the following: the silencer, the silencer plate 320, and the flue gas duct. Advantageously, the silencer comprises only one service aisle 330, wherein this service aisle should have access to the boundaries of the silencer (that is, the walls of the flue gas duct) and the silencer plates 320, as shown in FIGS. 3b to 3e. The silencer may also comprise several service aisles, for example if the flue gas duct is divided by silencer plates into separate compartments. Thus, the movement from one service aisle to another may take place, for example, outside the silencer. The movement may take place either outside the flue gas duct or above or below the silencer in the flue gas duct. The silencer may also comprise a service platform 334 (FIG. 6a) which is used as the bottom of the service aisle 330. Also, a service platform 334 may be provided in the flue gas duct of the boiler, which platform is used as the bottom of the service aisle 330 for the silencer. It is also possible to utilize other supporting structures of the flue gas duct in the maintenance.

Advantageously, the service aisle is so wide that a maintenance person can walk along the service aisle. Advantageously, the service aisle is so wide in the narrowest point that a maintenance person can walk along the service aisle. As an example, the width of the service aisle 330 in its narrowest point is denoted with the reference numeral 332 in FIG. 3c. The width of the service aisle in the narrowest point may be at least 40 cm, at least 60 cm or at least 80 cm. The service aisle may also be narrower in its width than the silencer plate 320, wherein such a part of the resonating area which comprises the service aisle, can be truncated by a single silencer plate. For example, the width 332 of the service aisle illustrated in FIG. 3c is smaller than the width of the silencer plate denoted by the reference numeral 320b. The width of the silencer plate 320b may be, for example, 90 cm. Consequently, the width of the service aisle may be, for example, smaller than 90 cm. In particular, the width of the service aisle in the narrowest point may be about 50 to 80 cm.

FIG. 4a shows a silencer plate 320 in a side view, and FIG. 4b shows the same plate in another side view. As a plate-like piece, the silencer plate 320 of FIG. 4a comprises a first side and a second side. Between these sides, the silencer plate 320 comprises a core 322. The core comprises sound absorbing material. The core 322 may comprise, for example, fibrous material, such as soft mineral wool. The density of such mineral wool may be about 50 kg/m$^3$. The silencer plate of FIG. 4a further comprises a surface plate 326. The function of the surface plate is to reinforce the silencer plate, and it may be made of a wear-proof material, such a metal, for example steel. The surface plate 326 may reinforce the silencer plate against wearing caused by, for example, the removal of dust.

Advantageously, the surface plate used in the silencer does not reflect sound. To prevent reflecting, the surface plate is provided with holes shown in FIG. 4b. The surface are of a surface plate 326 equipped with holes, in relation to the surface area of a corresponding plate without holes, may be, for example, smaller than 75%, smaller than 50%, or smaller than 33%. FIG. 4b shows the surface plate 326 seen from the front, and a connecting layer 324 visible through the holes of the surface layer. The connecting layer 324 is connected to both the core 322 and the surface plate 326. The connecting layer may consist of a sound absorbing material, or it can be used as a support between the surface plate and the core. The connecting layer may comprise, for example, a mineral wool sheet. The thickness of the connecting layer can be, for example, 20 mm, and its density can be, for example, 250 kg/m$^3$. The height $h_p$ of the silencer plate 320 can be, for example, between 1 and 5 m, and for example about 3.5 m. The width $w_p$ of the silencer plate 320 can be, for example, between 500 and 2,000 mm, and for example about 900 mm. The thickness $t_p$ of the silencer plate 320 can be, for example, between 100 and 500 mm, and for example about 300 mm. The efficiency of the silencer can be influenced by the content of absorbing material in the silencer, that is, the thickness of the core 322 of the silencer plate 320, the height $h_p$ of the silencer plate, the width $w_p$ of the silencer plate, and the number of silencer plates 320 in the silencer.

The flue gas ducts can be sooted with a dust removal device. The dust removal device can be driven by, for example, steam, wherein steam discharged by pressure from the dust removal device sweeps the flue gas duct. The dust removal device can be placed, for example, in the lower part of the smoke passage 300, wherein it can be placed below the silencer. The flue gas duct may be provided with several dust removal devices. The silencer plate 320 to be used in the silencer can be protected from the dust removal device by a casing 328 (FIG. 4a). The casing may be, for example, a bent metal plate. The casing is closed from below, wherein steam from the dust removal device does not enter the core 322 or the connecting layer 324 of the silencer plate. The dust removal device may be arranged above the silencer plate as well. The silencer plate 320 may also comprise a casing 328 in its upper part (not shown in the figure).

With reference to FIG. 5a, the silencer plate 320 does not necessarily comprise a casing 328. The silencer plates can also be protected from the dust removal device by placing them in a frame 500 closed from below. The frame may be closed from above as well. FIG. 5a illustrates, in a side view, the silencer wall 340 left between the side walls 306, 308 of the smoke passage and comprising silencer plates 320. Silencer plates 320 are arranged in a frame 500. The frame 500, in turn, may have been mounted by means of lower supports 510 and upper supports 520. Either of the supports 510, 520 can be used as the structure supporting the wall 340, and the other supports 520, 510 can be used primarily as guides. It is also possible that all the supports support the wall 340 of the silencer. For example, the lower supports 510 can support the frame 500 and thereby the wall 340, while the upper supports guide the upper edge of the frame. In a corresponding manner, the frame can be suspended by the upper supports 520. In this case, the lower supports are not necessarily needed for guiding the wall, but the wall is guided by gravity to the correct location. The upper supporting structures 520 can be coupled to the supporting structures of the water preheater. The lower supporting structures 510 can be coupled to the supporting structures of the air preheater. The silencer may also be placed elsewhere in the flue gas duct. Thus, the upper supporting structures 520 can be coupled to the supporting structures of the air preheater. In a corresponding manner, the lower supporting structures 510 can be coupled to the supporting structures of the water preheater. Either of the supporting structures 510, 520 can be coupled, if necessary, to the supporting structures of the evaporator.

FIG. 5b illustrates the frame 500 and the wall 340 in the cross-sectional plane Vb-Vb of FIG. 5a. The frame 500 can have the shape of a U profile which opens towards the silencer plate 320. The silencer plate, in turn, is arranged in the channel of the frame, wherein the frame 500 protects the silencer plates. The frame can protect the silencer plates both from below and from above, as shown in FIG. 5b.

It is obvious that the above-presented silencer solution is suitable for use in flue gas ducts in connection with various combustion processes. In particular, the solution is suitable for boilers, such as power plant boilers. Thus, the boiler according to the invention comprises a boiler silencer according to the invention in its flue gas duct. In a corresponding manner, the power plant boiler according to the invention comprises a boiler silencer according to the invention in its flue gas duct.

Figure 6A:
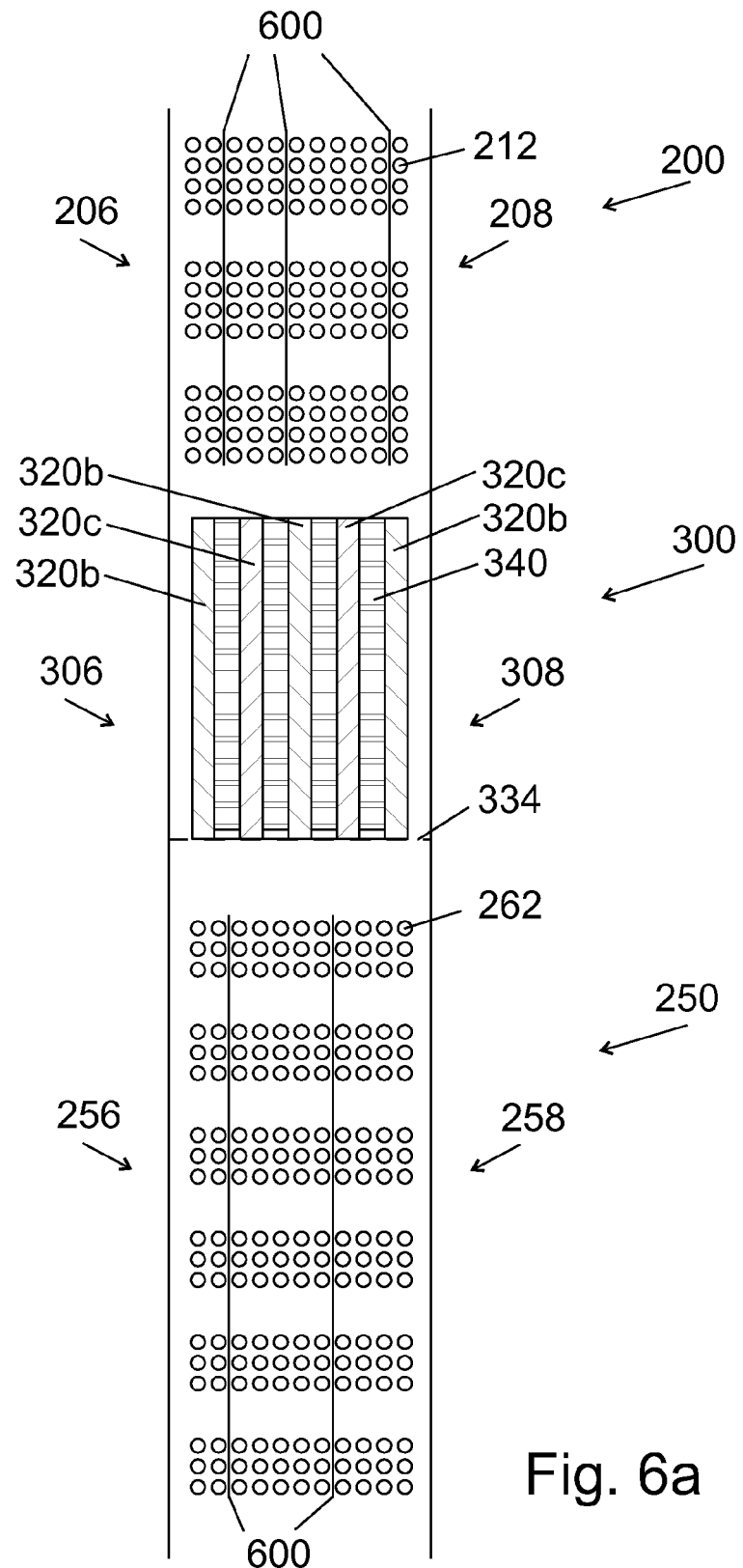
FIGS. 6a to 6c show some silencer solutions for a flue gas duct of a boiler.

FIG. 6a shows a part of the flue gas duct of a boiler in a side view. The figure shows the water preheating area 200, the smoke passage 300, and the preheating area 250 for incoming air. Said areas are left between the first side walls 206, 306 and 256 as well as the second side walls 208, 308 and 258. The water preheating area 200 comprises heat exchanger pipes 212. The heat exchanger pipes used for preheating water can have a diameter of about 40 mm, and the distance between the pipes can be about 70 mm (from centre to centre). Moreover, the preheating area for combustion air comprises heat exchanger pipes 262. The heat exchanger pipes 262 used for preheating combustion air can have a diameter of, for example, 50 mm. The distance between the heat exchanger pipes 262 can be, for example, 75 mm. In FIG. 6a, the smoke passage 300 is equipped with a silencer according to FIG. 3b. In said view, the wall 340 as well as the silencer plates 320c in the vicinity of the wall of the flue gas duct, and the silencer plates 320b in the vicinity of the wall 340 are visible.

The noise level of the boiler of FIG. 6a is reduced further by providing vibration preventing plates 600 in the flue gas duct. The vibration preventing plates 600 are substantially parallel to the flow direction of the flue gases. The boiler may comprise a vibration preventing plate 600 in the water preheating area 200. In addition or alternatively, the boiler may comprise a vibration preventing plate 600 in the air preheating area 250. The vibration preventing plate 600 is arranged between the heat exchanger pipes in a direction transverse to the flow direction of the flue gases. Thus, resonation in the heat exchanger area of the flue gas duct can be reduced. In FIG. 6a, the heat exchanger pipes are substantially transverse to the flow direction of the flue gases. In some solutions, heat exchanger pipes are used, which are substantially parallel to the flow direction of the flue gases. In addition, the vibration preventing plates are substantially parallel to the heat exchanger pipes. The distance between the heat exchanger pipes is typically smaller than the thickness of the silencer plate 320. In the above described manner, the distance between the heat exchanger pipes can be, for example, in the order of a few centimeters, wherein noise absorbing silencer plates can be installed between the heat exchanger pipes. The vibration preventing plate 600 can be a metal plate for the purpose of, for example, reflecting sound and thereby changing its resonance frequency. The thickness of the vibration preventing plate can be between 1 and 15 mm, for example about 5 mm. Furthermore, vibration preventing plates can be placed at several distances from each other and/or from the wall of the flue gas duct, wherein several self-resonant frequencies are formed in the flue gas duct, corresponding to the distances of the plates from each other or from the wall of the flue gas duct, or to the width or depth of the flue gas duct. Vibration preventing plates 600 can also be used between the evaporator 130 and the heat exchanger pipes 132.

The silencer can be placed upstream of the vibration preventing plates 600 in relation to the flow direction of flue gases in the flue gas duct; the silencer can be placed downstream of the vibration preventing plates; or the silencer can be placed between two vibration preventing plates in this direction, as shown in FIG. 6a. The vibration preventing plates can be substantially transverse to the wall 340.

In a test, the noise level caused by a boiler was measured, when the flue gas duct was provided with vibration preventing plates 600 only and when the smoke passage 300 of the flue gas duct was further provided with a silencer. The silencer was detected to reduce the noise level by 10 to 15 dB at some frequencies, compared with a situation in which the noise was suppressed by vibration preventing plates 600 only. With the silencer, low frequencies corresponding particularly to the third resonance frequency could be suppressed. In the tests, the embodiment of FIG. 3b was applied, and the thickness of the silencer plates was 300 mm.

Figure 6B:
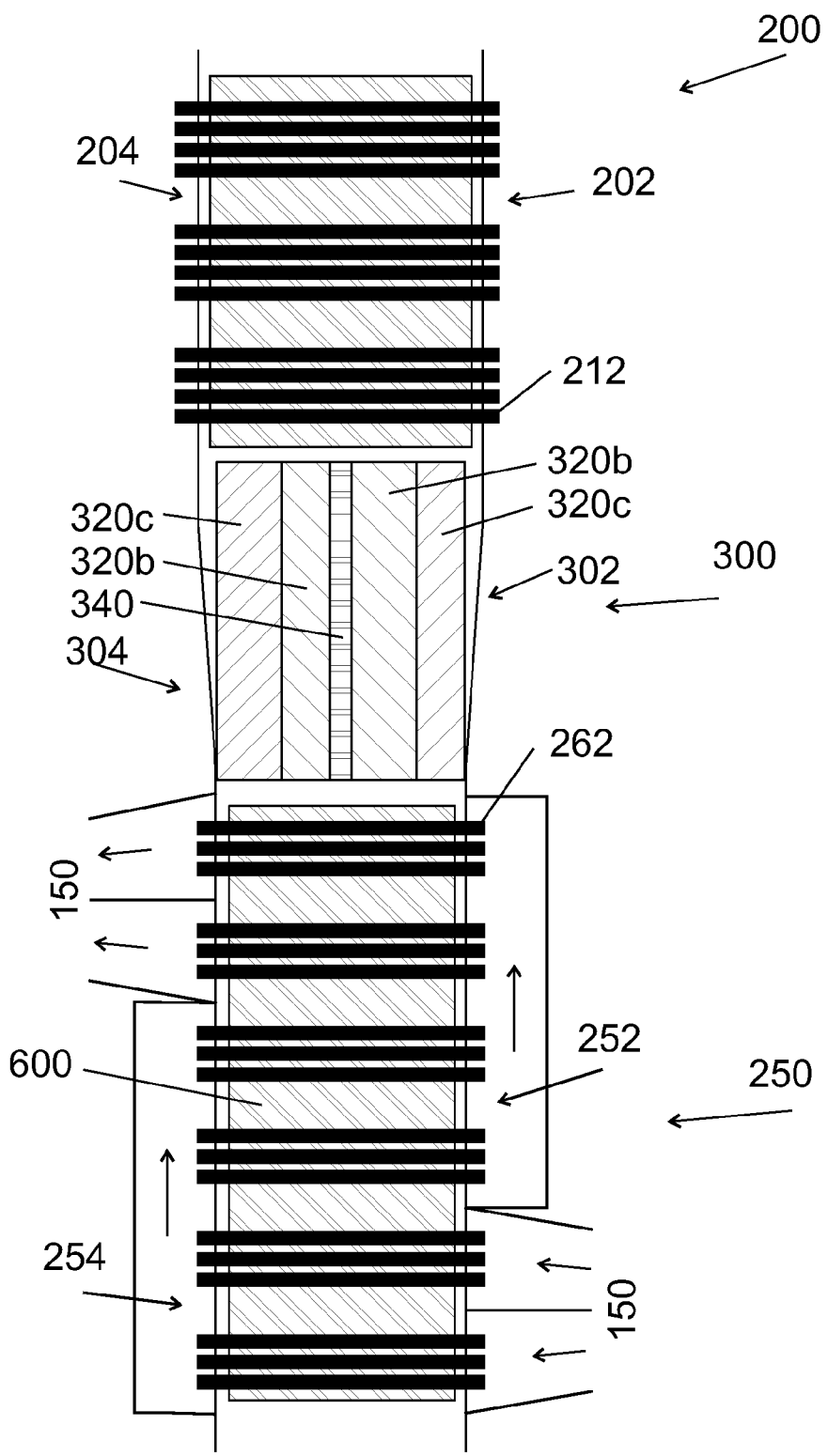

FIG. 6b shows the part according to FIG. 6a of the flue gas duct of a boiler, in another side view. Particularly for the smoke passage 300, the wall 340 of the silencer and silencer plates substantially transverse to this are visible. The silencer plates of the wall 340 could be arranged in a frame 500. The silencer is mounted in place, although the lower and upper supporting structures 510 and 520 are not shown in FIGS. 6a to 6c.

Figure 6C:
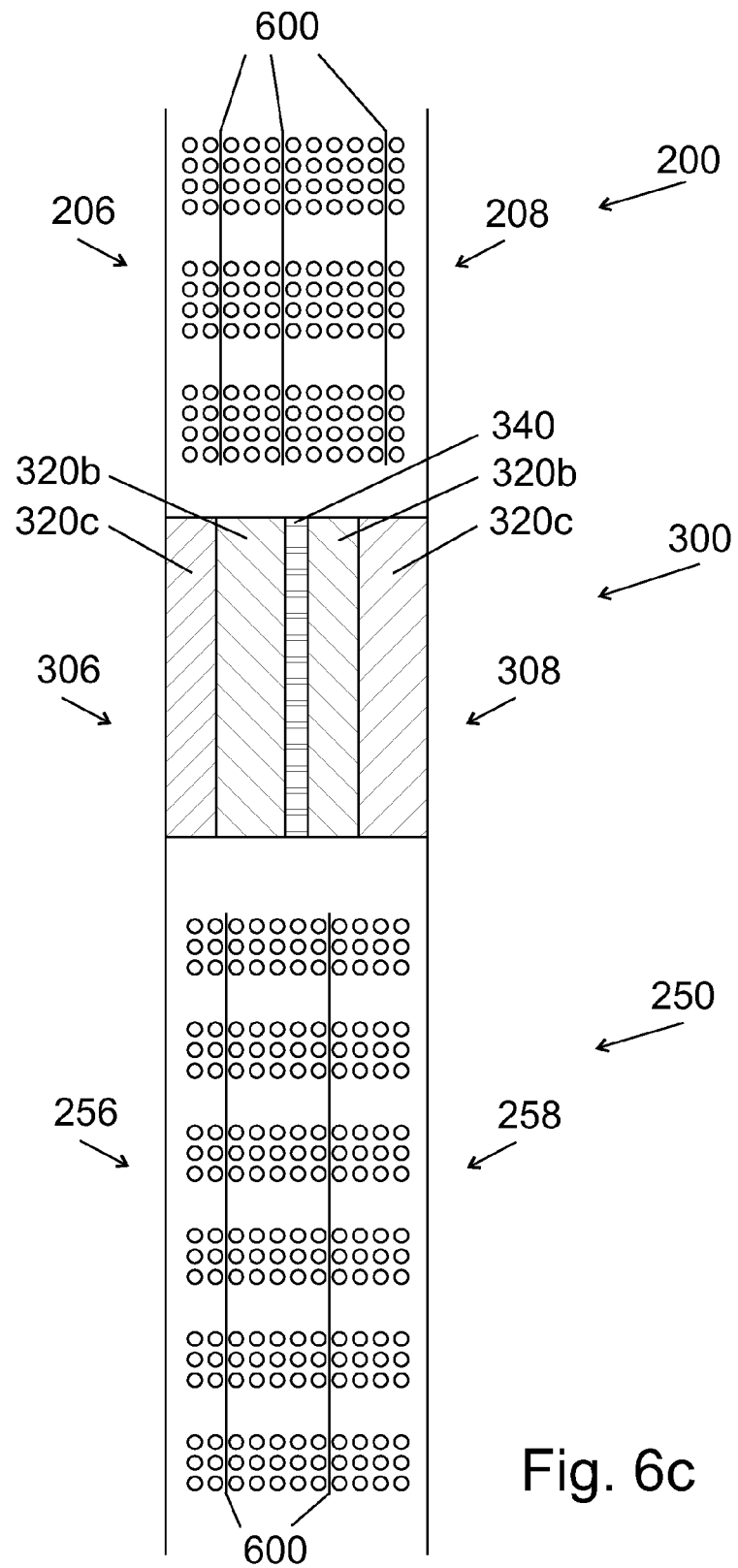

FIG. 6c shows a part of the flue gas duct of a boiler. The figure is substantially similar to FIG. 6a, but the silencer of the smoke passage is turned 90 degrees in the plane transverse to the flow direction of the flue gases, and correspondingly, the length of the wall 340 and the length of the parts 320b and 320c transverse to it are changed. The transverse parts may also comprise more than one silencer plate. For example, by turning FIG. 3c clockwise 90 degrees, it is possible to arrive at the silencer arrangement substantially according to FIG. 6c.

Furthermore, it has been found that the noise absorbing silencer plates 320 work particularly well if they are placed downstream of the heat exchanger pipes in the flow direction of the flue gases in the flue gas duct. Such heat exchanger pipes can be, for example, heat exchanger pipes 132 of the evaporator 130, heat exchanger pipes 212 of the water preheater, or heat exchanger pipes 262 of the preheater for combustion air. It is also possible to arrange the preheater for combustion air in connection with the water preheater, in which case the silencer plates can be placed downstream of all the above-mentioned heat exchanger pipes 132, 212, 262.

It is possible that precisely the heat exchanger pipes (132, 212, 262) in the flue gas duct cause turbulence in the flow of the flue gases. The turbulence, in turn, can cause noise. It may be that the silencer works well particularly downstream of the heat exchanger pipes, because of the described mechanism of origin of the noise. In addition, a space should be provided for the silencer and its silencer plates 320 in the flue gas duct. In some applications, the flue gas duct is provided with a space for the silencer exactly in the smoke passage 300 between the water preheating area and the air preheating area.

Furthermore, the placement of the silencer plates downstream of the heat exchanger pipes has the advantage that the temperature of the flue gases is lower downstream than upstream of the heat exchanger pipes, so that the silencer is not subjected to such a hot environment as if placed upstream of the heat exchanger pipes. For example, the heat exchanger plates can be arranged to resist temperatures of about 400° C., in which case the flue gases have to be cooled before the silencer. The cooling takes place advantageously by heat exchanger pipes of the boiler, by which heat is recovered. Such heat resistance can be achieved, for example, by using carbon steel as the surface plate 326 in the silencer plate 320. Some materials, such as ceramics, may stand higher temperatures. In an embodiment, the surface plate 326 comprises carbon steel.

Figure 7:
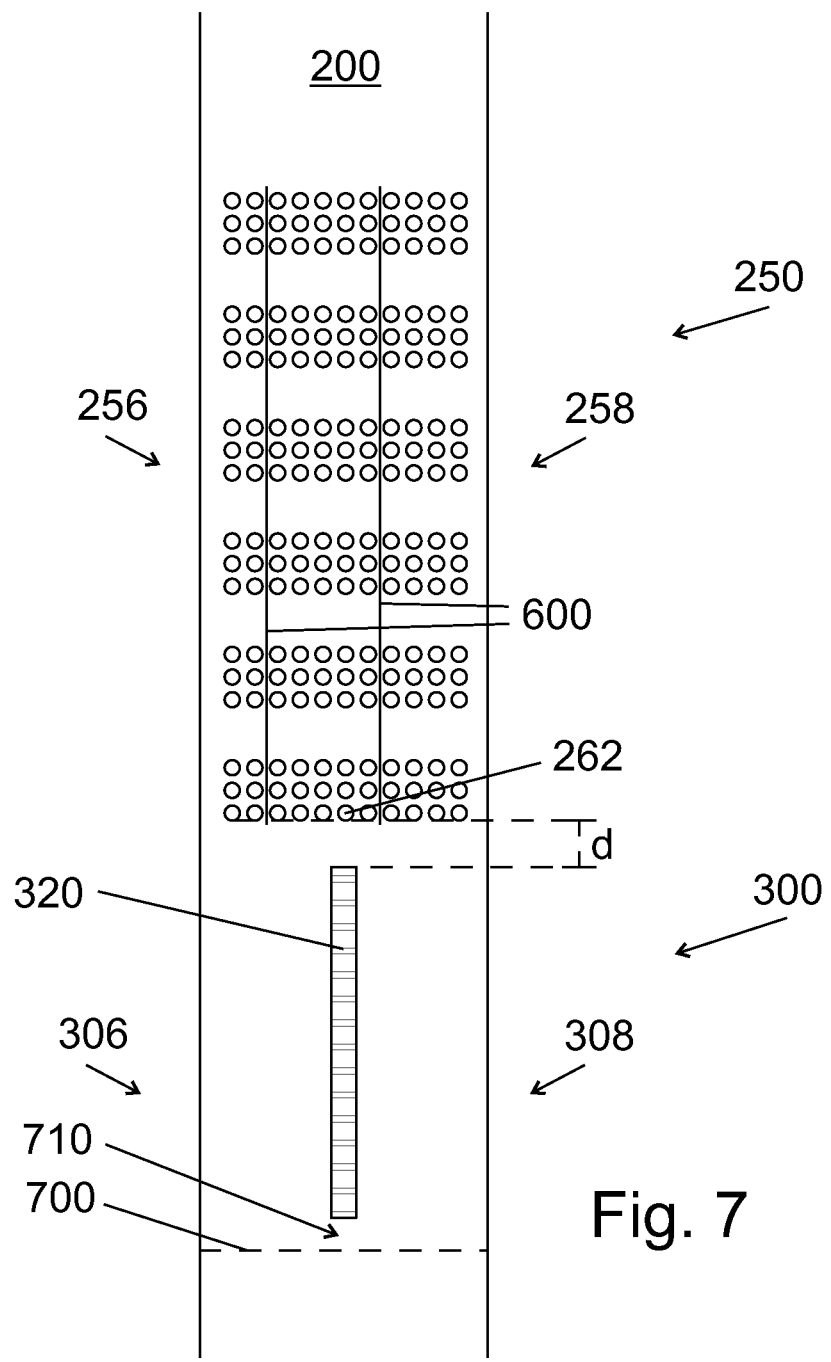
FIG. 7 shows a silencer solution for a flue gas of a boiler.

Advantageously, at least one silencer plate 320 is placed immediately downstream of either the heat exchanger pipe 132 of the evaporator, the heat exchanger pipe 212 of the water preheater, or the heat exchanger pipe 262 of the air preheater in the flow direction of the flue gases in the flue gas duct. Thus, a distance d can be left between the silencer plate 320 and the heat exchanger pipe. FIG. 7 shows part of the flue gas duct of a boiler in a side view. In the embodiment of FIG. 7, the flue gas duct of the boiler is provided with a water preheating area 200, an air preheating area 250, and a smoke passage 300, respectively, in the flow direction of the flue gases. A silencer plate 320 is arranged in the smoke passage. The boiler of FIG. 7 also comprises vibration preventing plates 600. In some other embodiments of the invention, no vibration preventing plates 600 are provided. In the embodiment of FIG. 7, a distance d is left between the silencer plate 320 and the heat exchanger pipe 262. The distance d is measured from the heat exchanger pipe 262 towards the silencer plate 320 substantially in the flow direction of the flue gases. It is obvious that the distance of other heat exchanger pipes from the silencer plate 320 can be greater, in which case the distance d refers to the distance between the silencer plate 320 and the heat exchanger pipe 262 that is closest to it in the direction substantially opposite to the flow direction of the flue gases. With said directions, the distance d is positive; that is, the distance does not refer to the distance between the silencer plate and a possible next heat exchanger pipe downstream in the flow direction of the flue gases in the flue gas duct. The distance d is advantageously small, wherein a lot of noise absorbing material, that is, a large silencer plate 320, can be arranged in the empty space in the flue gas duct. Furthermore, it is possible to try to prevent low-frequency resonance in the flow direction of the flue gases by selecting a small distance d. It is possible to try to prevent such resonance if, for example, the distance d is smaller than the width W of the duct or smaller than the depth L of the duct. Thus, the distance d is smaller than the greater of these dimensions. It is possible to try to prevent the resonance if, for example, the distance d is smaller than the width W of the duct and smaller than the depth L of the duct, wherein the distance d is smaller than the smaller of these dimensions. Furthermore, for example in a duct with a circular or square cross-section, the width and the depth can be equal. For example, with said size of the flue gas duct, the distance d can be smaller than 8 m or smaller than 3.5 m. The distance can also be smaller, for example smaller than 2 m. Advantageously, the distance d is smaller than 1 m, and most advantageously about 0.5 m. The distance d can also be smaller than this, but in such a case, the mounting of the plates to the structure can be difficult. In other embodiments, the distance d can be left between the heat exchanger pipe 212 of the water preheater and the silencer plate 320, or between the heat exchanger pipe 132 of the evaporator and the silencer plate 320, depending on the heat exchanger, downstream of which the silencer plate 320 is placed.

If the silencer plate is close to the heat exchanger pipes, it is also possible to achieve a sufficient noise suppression with simpler silencer solutions. Thus, the simple silencer can consist of, for example, a noise absorbing silencer plate 320. Alternatively, the silencer can comprise a noise absorbing silencer plate 320.

Figure 8A:
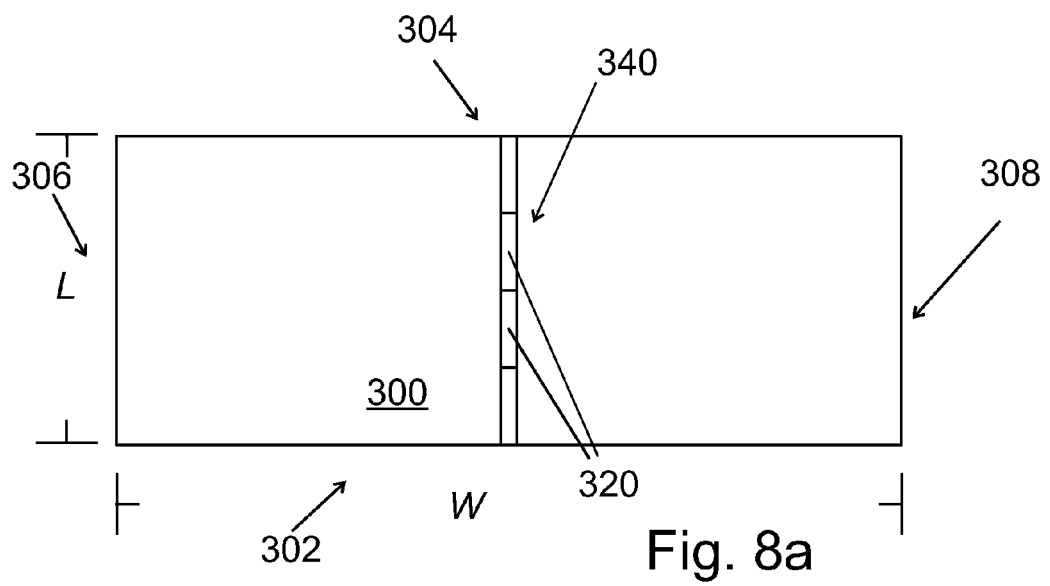
FIGS. 8a and 8b show embodiments of a silencer in an elevation.

FIG. 8a shows a silencer comprising silencer plates 320. The silencer plates 320 make up a wall 340. The silencer plates 320 are substantially parallel to each other. The wall 340 is arranged to truncate the resonating space in the width direction of the flue gas duct, corresponding to the width W. In an embodiment, the wall 340 is shorter than the depth dimension of the flue gas duct (corresponding to the depth L), wherein the wall 340 is arranged to make the width of the resonating area narrower.

Figure 8B:
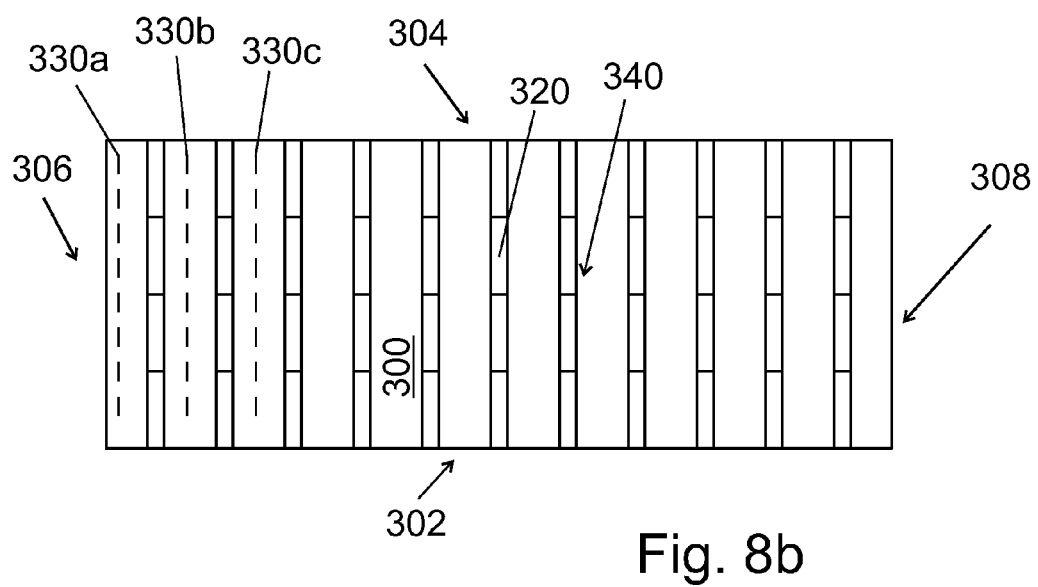

FIG. 8b shows a silencer comprising several parallel silencer plates 320. The parallel silencer plates make up parallel walls 340. The parallel walls 340 are spaced from each other in a direction transverse to the flow direction of the flue gases. The walls can be parallel to a wall of the flue gas duct, for example the front wall 302 or the side wall 306. The walls 340 can also be placed at an angle to the front wall 302 or the side wall 306.

The silencer shown in FIG. 8b does not comprise a service aisle having access to all the walls 302, 304, 306 and 308 of the flue gas duct. Thus, for maintenance of the silencer, the boiler may comprise a subfloor level 700 (FIG. 7). A subfloor space 710 is left between the subfloor level 700 and the silencer plate 320. By means of such a subfloor space 710, it is possible to maintain also the silencer of FIG. 8b. Thus, the height of the subfloor space 710, that is, the distance between the subfloor level 700 and the silencer plate 320, can be such that a maintenance person can fit to crawl from the service aisle 330a through the subfloor space to the second service aisle 330b. The height of the subfloor space can be, for example, 50 cm, 60 cm or 70 cm. Advantageously, the subfloor space is low, so that the height of the silencer plate can be great. For example, a maintenance person can move onto the subfloor level 700 and maintain the first part of the silencer via the service aisle 330a. Through the subfloor space 710, the maintenance person can move to the next service aisle 330b and further to the next service aisle 330c. In this way, by means of the subfloor space 700, it is possible to maintain the silencer plates 320 and the walls 302, 304, 306 and 308 of the flue gas duct.

In the silencer, it is possible to use silencer plates protected with a casing 328 below or on top (FIGS. 4a and 4b). The silencer plates can be installed in a frame 500 (FIGS. 5a and 5b). The frame can be mounted by means of supporting structures 510 or 520. In some embodiments, the supporting structure 510 or 520 can be fastened to the supporting structure for the air or water preheater, or the supporting structure for the evaporator 130. Furthermore, the silencer may comprise a service aisle with access to the walls 302, 304, 306 and 308 of the flue gas duct of the boiler, as well as to the silencer plates 320.

The presented silencer can be used in boilers, such as power plant boilers. One example of a power plant boiler is a fluidized bed boiler. The presented solution can be placed in a substantially vertical or a substantially horizontal flue gas duct, or the flue gas duct can be at another angle.

The invention claimed is:
1. A boiler comprising:
  a flue gas duct with a width W and a depth L;
  heat exchanger pipes in the flue gas duct, for heating or preheating liquid, steam or air;
  a first planar silencer plate substantially parallel to the flow direction of the flue gases, the first silencer plate comprising noise absorbing material, said first silencer plate being placed downstream of any of said heat exchanger pipes in the flow direction of the flue gases in said flue gas duct, and the distance d between said first silencer plate and said heat exchanger pipe being smaller than the width W of the flue gas duct or smaller than the depth L of the flue gas duct;
  at least one noise absorbing wall, the wall comprising said first silencer plate, and the wall truncating the resonating area transverse to the flow direction of the flue gases in the flue gas duct;
  a subfloor level for maintaining the silencer plate or the flue gas duct; and
  a subfloor space left between the subfloor level and the silencer plate, wherein the silencer plate suppresses noise caused by turbulence of the flow of the flue gases.
2. The boiler according to claim 1, wherein the silencer plates delimit a service aisle in a plane substantially transverse to the silencer plates, for maintaining the silencer, the silencer plate, or the flue gas duct, and the service aisle has access to the boundaries of the silencer and the silencer plates.

3. The boiler according to claim 1, wherein said first silencer plate is placed downstream of a water preheating area and wherein said first silencer plate is placed upstream of a preheating area for incoming air.

4. A boiler comprising:
a flue gas duel with a width W and a depth L;
heat exchanger pipes in the flue gas duct, for heating or preheating liquid, steam or air;
a first planar silencer plate substantially parallel to the flow direction of the flue gases, the first silencer plate comprising noise absorbing material, said first silencer plate being placed downstream of any of said heat exchanger pipes in the flow direction of the flue gases in said flue gas duct, and the distance d between said first silencer plate and said heat exchanger pipe being smaller than the width W of the flue gas duct or smaller than the depth L of the flue gas duct;
at least one noise absorbing wall, the wall comprising said first silencer plate, and the wall truncating the resonating area transverse to the flow direction of the flue gases in the flue gas duct;
a second planar silencer plate substantially parallel to the flow direction of the flue gases, the second silencer plate comprising noise absorbing material; and
a second wall, which said second wall is substantially parallel to the first silencer plate and spaced at a distance from the first silencer plate in a direction substantially transverse to the flow direction of the flue gases, the second wall comprising said second silencer plate, wherein the silencer plate suppresses noise caused by turbulence of the flow of the flue gases.

5. The boiler according to claim 4, wherein the silencer plates delimit a service aisle in a plane substantially transverse to the silencer plates, for maintaining the silencer, the silencer plate, or the flue gas duct.

6. The boiler according to claim 5, wherein the service aisle has access to the boundaries of the silencer and the silencer plates.

7. The boiler according to claim 4, further comprising a frame, said first silencer plate being placed in said frame for protecting the silencer plate from a dust removal device.

8. The boiler according to claim 4, wherein said first silencer plate is placed upstream of a preheating area for incoming air.

9. The boiler according to claim 4, wherein said first silencer plate is placed downstream of a water preheating area, and wherein said first silencer plate is placed upstream of a preheating area for incoming air.

10. The boiler according to claim 4, wherein the silencer plate comprises
a noise absorbing core comprising noise absorbing material, such as soft mineral wool; and
a surface plate on its surface, for protecting the inner parts of the silencer plate, the surface plate comprising holes for transmitting sound.

11. The boiler according to claim 4, further comprising a vibration preventing plate which is a planar plate substantially parallel to the flow direction of the flue gases, which vibration preventing plate is left between two heat exchanger pipes in a direction transverse to the flow direction of the flue gases, for diminishing resonance in the heat exchanger area of the flue gas duct.

12. A boiler comprising:
a flue gas duct with a width W and a depth L;
heat exchanger pipes in the flue gas duct, for heating or preheating liquid, steam or air; and
a first planar silencer plate substantially parallel to the flow direction of the flue gases, the first silencer plate comprising noise absorbing material, said first silencer plate being placed downstream of any of said heat exchanger pipes in the flow direction of the flue gases in said flue gas duct, and the distance d between said first silencer plate and said heat exchanger pipe being smaller than the width W of the flue gas duct or smaller than the depth L of the flue gas duct;
at least one noise absorbing wall, the wall comprising said first silencer plate, and the wall truncating the resonating area transverse to the flow direction of the flue gases in the flue gas duct; and
a second planar silencer plate substantially parallel to the flow direction of the flue gases, the second silencer plate comprising noise absorbing material, said second silencer plate being placed downstream of any of said heat exchanger pipes in the flow direction of the flue gases in said flue gas duct, and the second silencer plate is placed at an angle to the first silencer plate, wherein the width of the resonating area of the flue gas duct becomes narrower in two directions transverse to the flow direction of the flue gases,
wherein the silencer plate suppresses noise caused by turbulence of the flow of the flue gases.

13. The boiler according to claim 12, wherein the second silencer plate is placed substantially transversely to said first silencer plate.

14. The boiler according to claim 12, wherein the flue gas duct comprises:
two parallel side walls; and
a front wall and a rear wall substantially transverse to the side wall, in which boiler the silencer plates of the silencer are arranged in such a way that there is no transverse visual connection between the parallel side walls of the flue gas duct.

15. The boiler according to claim 14, wherein the silencer plates of the silencer are arranged in such a way that there is no transverse visual connection between the parallel front wall and rear wall of the flue gas duct.

16. The boiler according to claim 12, further comprising a frame, said first silencer plate being placed in said frame for protecting the silencer plate from a dust removal device.

17. The boiler according to claim 12, wherein said first silencer plate is placed upstream of a preheating area for incoming air.

18. The boiler according to claim 12, wherein said first silencer plate is placed downstream of a water preheating area and wherein said first silencer plate is placed upstream of a preheating area for incoming air.

19. The boiler according to claim 12, wherein the silencer plate comprises:
a noise absorbing core comprising noise absorbing material, such as soft mineral wool; and
a surface plate on its surface, for protecting the inner parts of the silencer plate, the surface plate comprising holes for transmitting sound.

20. The boiler according to claim 12, further comprising a vibration preventing plate which is a planar plate substantially parallel to the flow direction of the flue gases, which vibration preventing plate is left between two heat exchanger pipes in a direction transverse to the flow direction of the flue gases, for diminishing resonance in the heat exchanger area of the flue gas duct.

* * * * *